United States Patent [19]

Moser et al.

[11] 4,413,509

[45] Nov. 8, 1983

[54] COMBUSTION PROCESS PARAMETER SENSOR

[75] Inventors: Winfried Moser, Markgröningen; Klaus Müller, Tamm; Franz Rieger, Aalen, all of Fed. Rep. of Germany

[73] Assignee: Robert Bosch GmbH, Stuttgart, Fed. Rep. of Germany

[21] Appl. No.: 313,359

[22] Filed: Oct. 20, 1981

[30] Foreign Application Priority Data

Dec. 4, 1980 [DE] Fed. Rep. of Germany ....... 3045721

[51] Int. Cl.³ .......................................... G01M 15/00
[52] U.S. Cl. ...................................... 73/117.3; 73/115
[58] Field of Search ................... 73/116, 119 A, 117.3, 73/115; 350/96.1

[56] References Cited

U.S. PATENT DOCUMENTS 4,169,388 10/1979 Teitelbaum et al. .............. 73/115 X
4,337,648 7/1982 Gillespie ....................... 73/119 A X Primary Examiner—Jerry W. Myracle
Attorney, Agent, or Firm—Frishauf, Holtz, Goodman & Woodward

[57] ABSTRACT

To provide for simultaneous transmission of pressure signals and light signals from the combustion chamber (CC) of an internal combustion engine or, selectively, either one or the other of the pressure or light signals, independently, a spark plug-type housing (1, 2) has a glass plug (3) fitted therein, the end face of which at the side remote from the combustion chamber engaging a piezo-ceramic ring (4). The inner opening of the ring (4) transmits light from the glass plug or rod 3 to a light guide fiber cable (7) which, concentrically and insulated from each other, has a metal woven sleeve (10) placed thereabout, and an outer metallic jacket (12), the woven sleeve (10) being connected to a flanged ring (6, 6a) engaging one end face of the piezo-ceramic ring (4), the other end face being connected to the outer metallic sleeve (12) to provide a coaxial electrical signal output cable, with the inner portion thereof surrounding and forming a jacket for the light guide fiber cable (7).

7 Claims, 1 Drawing Figure

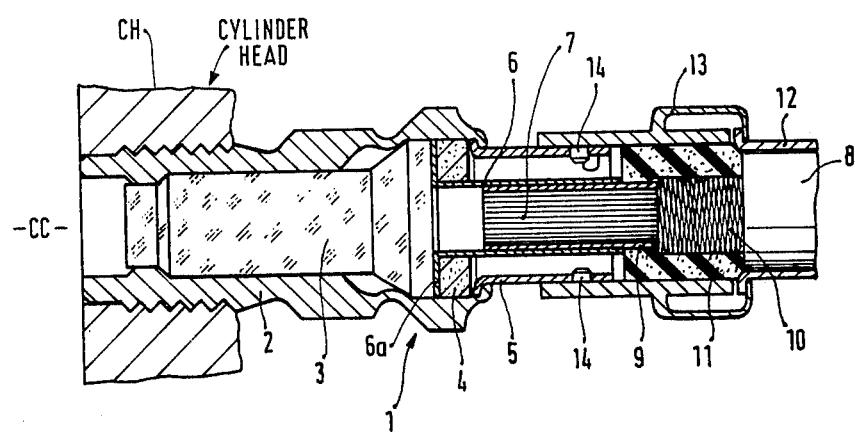

COMBUSTION PROCESS PARAMETER SENSOR

Reference to related application, assigned to the assignee of this invention.
U.S. Ser. No. 214,481, filed Dec. 9, 1980, MULLER, LINDER & MAURER.

The present invention relates to a combustion process sensor construction and more particularly to a combustion process sensor which is adapted to be inserted through the cylinder head of an internal combustion engine, which may be an Otto-type engine or a Diesel-type engine, and which includes a light guide element to permit viewing of the actual combustion process which occurs upon ignition of the air-fuel mixture within the combustion chamber of the engine.

BACKGROUND

It is desirable to determine the occurrence of various physical parameters during the combustion phase of the air-fuel mixture occurring within the combustion chamber of an internal combustion engine. Preferably, the combustion process with respect to time should be observed during actual operation of the engine. Observation may, for example, extend to the temporal and geometric distribution of the flame occurring during combustion; sensing of the ignition instant, sensing of fuel injection or supply processes; and, especially, sensing of undesirable or irregular combustion processes.

Irregular combustion may result in knocking of the engine. Such knocking occurs under certain operating conditions. Knocking, as usually understood, is caused by oscillations within the audible frequency band of the compressed fuel-air mixture which is triggered by a shock wave. The heat transmission to the piston walls and cylinder walls of the engine is substantially increased during such oscillations. A thermal overload of the surfaces will result, so that knocking should be avoided. For most efficient operation of the engine, it is desirable to utilize the working range of the engine to the greatest possible extent and, therefore, the engine should be operated just below the "knocking limit". It is necessary to have some means which early and reliably indicate knocking or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 214,481, filed Dec. 9, 1980, MULLER et al now U.S. Pat. No. 4,393,687. This application discloses a sensor which includes light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration the light guide with a spark plug of an internal combustion engine, or to place light guides in the cylinder head gasket or seal, for eventual connection to photoelectric transducers.

Sensing physical parameters occurring with the combustion chamber of an IC engine by optical means causes problems: The optical element which faces the combustion chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

One of the difficulties which arise is that ordinary glasses which can provide windows to the light guides can be used only in the "cold" area of a sensor secured through a cylinder head of the IC engine, that is, at the side of the sensor remote from the combustion chamber since the heat during combustion will cause the glasses to melt. The glasses, however, being exposed to the combustion gases, will be subjected to fogging and deposits from combustion residues which will precipitate preferentially on the "cold" surface of the window, that is, cold with respect to combustion temperature. Yet, ordinary glasses have the advantage that they can be melted into a fitting or socket to be both gas-tight as well as pressure resistant to the high operating pressures arising within the combustion chamber. Light guides made of quartz-glass are temperature-stable, but cannot be placed in a sensor housing and secured by a melt connection.

Sensing only light as it occurs during combustion does not provide output indications of all conditions of combustion. Under some limiting conditions, the light output cannot be used to determine the occurrence of shock waves or the tendency for shock waves to occur. Light signals are not representative of primary released energy; thus, they cannot be used directly to determine the actual indicated pressure $p_i$ which occurs. The pressure in the combustion space is a secondary reaction which is mechanically utilized. Radiation losses and other losses cause a difference between light output and pressure. The average indicated pressure $p_i$ corresponds to the average torque per cycle of the internal combustion (IC) engine, and thus is a suitable parameter to optimize the ignition timing, and particularly the ignition instant of the IC engine to obtain maximum torque. Ignition systems which have optimizing circuitry to determine ignition timing may not operate to fullest advantage when using only light output as an indication of torque and, for some applications, it is desirable to accurately sense combustion space pressure as well as light output of the flame of the explosion and of burning of the fuel-air mixture. This is particularly important in order to recognize and sense irregular combustion conditions, and unusual and non-regular flame propagation within the combustion chamber.

THE INVENTION

It is an object to provide a sensor which permits sensing of light generated upon combustion and, additionally, pressure within the combustion chamber.

Briefly, a housing of the spark plug-type, has a light guide extending through the housing to transmit light from the interior of the combustion chamber during operation of the engine; in addition, a pressure measuring device is located in the housing, exposed to the combustion chamber, to measure pressures occurring in the chamber. In accordance with a feature of the invention, the pressure measuring element is a piezo-ceramic ring which is located on a rod-like light guide which senses the light output from the sensor. The electrical connections to the piezoelectric ring can be formed by suitable conductive sleeves surrounding the light guide, and concentric with the housing, or connected to the housing, respectively.

The combined light-and-pressure sensor has the advantage that simultaneous sensing of light and pressure, the principal physical effects during operation of the internal combustion engine which are important for its control, can be sensed. The light sensor, preferably, is so constructed that it responds to higher frequency signals; the pressure sensor is, preferably, arranged for lower frequency operation. The overall pressures, and pressure changes within the combustion chamber can thus be accurately evaluated, and measuring of the average induced pressure $p_i$ is possible; knocking oscillations which usually occur in a higher frequency range can be sensed by the light sensor.

The pressure sensing arrangement can be located in a housing which is part of a colder portion of the sensor, that is, one which is not immediately adjacent the combustion chamber. Thus, the pressure sensing element is not exposed to the extremely high combustion and explosion temperatures.

Simultaneously measurement of two physical parameters has the advantage that a redundency in measuring may be obtained since each one of the two measuring systems—light and pressure—at least to some extent are both sensitive to the same physical phenomena, even if indirectly. Thus, either system will—at least approximately—respond to a parameter for which it is not primarily intended, by indirected response. It is thus possible to carry out a test if one of the measuring systems has failed or become so contaminated as to have become inoperative.

It is also possible by the system to optically recognize ignition failures while simultaneously checking for compression of the cylinder in question. For example, the pressure at the top dead center (TDC) position can be obtained; or the integral of pressure over the path of the piston can be compared with a command or test value. By disconnecting fuel supply or inhibiting ignition, for example by disconnecting electrical supply to a spark plug, absolute pressures, pressure changes and integrated pressure, and thus compression ratios, can be checked directly with the same equipment used to test for proper engine operation.

DRAWING

The single FIGURE is a highly schematic axial sectional view through a combined light guide—pressure sensor element, for association with an internal combustion engine.

A housing 1, of general shape of a spark plug, is provided, formed with a thread to permit the housing 1 to be screwed into the cylinder head of an IC engine. The forward end of the housing 1 has a metallic socket 2 which surrounds a transparent glass element 3 which, when the sensor is assembled to the engine, faces the inside of the combustion chamber. The cylinder head is only schematically indicated by the portion CH, the combustion chamber being located in the region CC. The particular shape of glass element 3 and the construction of the light guide as such can be varied, for example to prevent contamination to the glass window 3, glass window 3 being shown essentially schematically.

At the side of the glass window 3 which is remote from the combustion chamber CC, a pressure measuring element 4 is positioned. Pressure measuring element 4 is a piezo-ceramic ring which engages the glass element 3. A contact sleeve 6 with an outwardly extending flange 6a is positioned between the glass element 3 and the piezoelectric ring 4. Sleeve 6 extends through the central opening formed by the ring-shaped piezo-electric element 4 towards the side of the sensor remote from the combustion chamber CC. A light guide or ligh guide fiber cable 7 is introduced and inserted into the sleeve 6. The light guide cable 7 is formed of a plurality of light guide fibers which terminate in a light guide cable 8. The light guide fibers are surrounded by a light guide jacket 9 in the region of the sleeve 6. A woven metal sleeve 10 surrounds the light guide jacket 9. The woven metal sleeve 10 is surrounded by an insulating sleeve 11 which, in turn, is surrounded by a metal sleeve 12 which forms a mechanical protection as well as one terminal for the piezoelectric ring 4. The metal sleeve 12 is connected by a bayonet-type connection 13 to the housing 1. The bayonet connector 13 is secured to the housing 1 by pins 14. Other types of connectors, for example screw connections, may be used.

The housing 1 retains a sleeve 5 to which the bayonet connector 13 is attached and with it is in electrical and mechanical engagement.

Operation: When the sensor is screwed into a cylinder head CH, light, upon combustion in the combustion chamber CC, will pass through the transparent glass plug 3 and through the central opening of the pressure ring 4 to be received by the light guide fibers of the light guide cable 7. Simultaneously, mechanical pressure will be transferred from the glass plug 3 over the flange 6a of the sleeve 6 on the pressure measuring ring 4. A voltage signal will occur which is derived, on the one hand, from the flange 6a and the metal sleeve 6, and, on the other, by a flange portion connected to the sleeve 5 and held in position by the housing 1. The flange portion of the sleeve 5 engages the end face of the ring 4 remote from the flange 6a. Electrical signal voltages, transferred over pins 14 to the bayonet connector 13 and hence to the outer metal sleeve 12, and the metal sleeve 6 and the metallic sleeve 10 will thus be available for connection to an evaluation circuit, for example a voltage sensing device. The sleeve 12 and the remaining portion of the housing form a ground or chassis connection. The inner metallic woven sleeve 10, which is connected electrically to the sleeve 6 over the inner sleeve 9, forms the other terminal for the evaluation pressure sensing circuitry, the light guide 7 at the cable output providing the light signal.

Various changes and modifications may be made within the scope of the inventive concept.

In one embodiment, the housing part 2 had an inner diameter of 8 mm in which a glass plug of quartz glass was fitted. The piezo-ceramic ring 4 had an inner opening of 6 mm, and primarily consisted of barium titanate.

The glass plug 3 was snugly received in the housing; to permit relative movement between the glass plug 3 and the piezoelectric ring 4, the housing was formed with a section of reduced wall thickness—see the drawing—to permit resilient transfer of compression shock waves to the ring 4.

We claim:

1. Combustion process parameter sensor to determine, simultaneously, pressure and optical physical effects of combustion processes within the combustion space of a combustion chamber (CC) of an internal combustion engine (CH) having
   a housing (1, 2),
   and, within the housing, the combination of a light guide means (3, 7) extending through the housing to transmit light from the interior of the combustion chamber during operation of the engine,
   with a pressure sensing means (4) located in the housing and exposed to the combustion chamber to measure pressures occurring in the chamber as the light guide means transmits light signals from the interior of the combustion chamber and to permit simultaneous evaluation of pressure and light phenomena during combustion within the combustion chamber.

2. Sensor according to claim 1, wherein the housing is an elongated cylindrical element;
   the light guide means comprises a rod or plug-like glass element (3) secured within the housing;
   and the pressure measuring means (4) comprises a piezo-ceramic ring positioned on the plug or rod-like glass element at the side thereof remote from the combustion chamber (CC), pressure variations being transmitted to the piezoelectric ring by the glass plug or rod, and light signals being, simultaneously, transmitted through the glass plug or rod (3).

3. Sensor according to claim 2, further comprising a flexible light guide (7) positioned within the housing and located in light-transmitting relationship thereto;
   a contact sleeve (6) surrounding the light guide, and a flexible conductive woven metal sleeve (11) coaxially surrounding the light guide at a region remote from said sleeve (6);
   an insulating sleeve (11) surrounding the flexible woven metal sleeve;
   an outer metal sleeve (12) surrounding the insulating sleeve (11);
   and means connecting the inner sleeve (9) and the outer metal sleeve (12) to opposite end faces of the piezoelectric ring (4).

4. Sensor according to claim 3, wherein said connecting means comprises a connecting sleeve (6) with an externally extending flange (6a) positioned between the glass plug or rod (3) and an end face of the piezo-ceramic ring (4);
   and an outer contact flange (5) engaging the other end face of the piezo-ceramic ring (4) and electrically connected to the outer sleeve (12).

5. Sensor according to claim 1, wherein the glass plug or rod (3) is positioned within the housing relative to the piezo-ceramic ring (4) to transmit pressures and pressure changes occuring in the combustion chamber (CC) to the piezo-ceramic ring (4), the housing (1, 2) being shaped to resiliently accomodate pressure changes and permit transmission of such pressure changes by the glass rod or plug (3) to the piezo-ceramic ring (4).

6. Sensor according to claim 1, wherein the housing (1, 2) is an essentially cylindrical element;
   the light guide means comprises a plug or rod-like element of glass;
   the pressure measuring means (4) comprises a piezo-ceramic ring coaxially positioned with respect to the glass plug or rod;
   and a light guide filament cable including coaxial metal connecting elements (6, 9, 10, 12) insulated from each other, surrounding the light guide fiber cable (7), and electrically connected to opposite end faces of the piezo-ceramic ring, the light guide cable transmitting light signals occurring during combustion of air-fuel mixtures in the combustion chamber, and the piezo-electric ring transmitting, over the coaxial electrical connection, electrical signals representative of pressure within the combustion chamber, simultaneously with, or independently of, transmission of light signals by the light guide cable.

7. Sensor according to claim 1, wherein the pressure sensing means comprises a piezoelectric element (4).

* * * * *